United States Patent [19]
Castel et al.

[11] Patent Number: 5,437,217
[45] Date of Patent: Aug. 1, 1995

[54] PNEUMATIC BOOSTER

[75] Inventors: Philippe Castel, Paris; Guy Meynier, Aulnay-Sous-Bois, both of France

[73] Assignee: AlliedSignal Europe Services Techniques, Drancy, France

[21] Appl. No.: 140,192
[22] PCT Filed: Oct. 29, 1993
[86] PCT No.: PCT/FR93/01068
 § 371 Date: Nov. 4, 1993
 § 102(e) Date: Nov. 4, 1993
[87] PCT Pub. No.: WO94/12378
 PCT Pub. Date: Jun. 9, 1994

[30] Foreign Application Priority Data
Nov. 26, 1992 [FR] France ............... 92 14206

[51] Int. Cl.⁶ ............................... F15B 9/10
[52] U.S. Cl. ..................... 91/369.2; 91/376 R
[58] Field of Search ............ 91/369.1, 369.2, 376 R; 92/48, 96, 98 R

[56] References Cited
U.S. PATENT DOCUMENTS

| | | | |
|---|---|---|---|
| 4,712,468 | 12/1987 | Blot | 91/369.2 X |
| 4,882,975 | 11/1989 | Shimamura et al. | 91/376 R |
| 4,893,691 | 1/1990 | Park | 180/169 |
| 5,066,077 | 11/1991 | Farr | 303/114 R |
| 5,172,964 | 12/1992 | Levrai et al. | 91/376 R X |
| 5,176,063 | 1/1993 | Levrai et al. | 91/376 R X |
| 5,279,203 | 1/1994 | Gautier et al. | 91/376 R X |

FOREIGN PATENT DOCUMENTS 0347583 5/1989 European Pat. Off. .
0478396 7/1991 European Pat. Off. .
3426964 1/1986 Germany .

Primary Examiner—Edward K. Look
Assistant Examiner—Hoang Nguyen
Attorney, Agent, or Firm—Larry J. Palguta; Leo H. McCormick, Jr.

[57] ABSTRACT

The invention relates to a motor vehicle pneumatic brake booster, comprising a casing (10) inside which a piston (20) formed from a rear tubular part (22) supporting a skirt (14) defines, with the aid of an unrolling membrane (12), a front chamber (16), permanently connected to a vacuum source and a back chamber (18) alternately connected to the front chamber (16) or to the atmosphere via a valve (40) actuated by a control rod (34) capable of bearing, by a plunger (32), on one of the faces of a reaction disk (58) securely fastened to a thrust rod (56), the valve comprising a valve element interacting via an active part (40) with a first valve seat (32a) formed on the plunger (32) and a second valve seat (20a) formed on the piston (20), the valve element (40) normally being stressed forward by an elastic element (44). According to the invention, actuation apparatus (60, 100, 160) are provided in order to stress the active part of the valve element (40) forward in simultaneous interaction with the first (32a) and second (20a) valve seats.

10 Claims, 3 Drawing Sheets

PNEUMATIC BOOSTER

The present invention relates to pneumatic boosters, and more particularly of the type which are used to provide boosted braking for motor vehicles.

Boosters of this type conventionally comprise a casing inside which a piston formed from a rear tubular part supporting a skirt defines, with the aid of an unrolling membrane, a front chamber, permanently connected to a vacuum source, and a rear chamber alternately connected to the front chamber or to the atmosphere via a valve means actuated by a control rod capable of bearing, by means of a plunger, on one of the faces of a reaction disk securely fastened to a thrust rod. The valve means comprises a valve element interacting via an active part with a first valve seat formed on the plunger and a second valve seat formed on the piston, the valve normally being stressed forwards by an elastic means.

Such boosters are conventionally located in the engine compartment of the vehicle, where available space is decreasing as the constructors desire to provide an increasing number of accessories, for example anti-lock devices for wheels, devices for preventing wheel spin on acceleration, anti-theft systems, etc., whilst taking the aerodynamics of the bonnet into account.

The constructors thus tend to want to integrate various systems into a single system, whilst, of course, respecting the safety standards.

On the other hand, various situations exist in which it is desirable to generate the increase in pressure in the braking circuit independently of the will of the driver of the vehicle, such as, for example, in order to prevent the wheels from spinning on acceleration, in order to fulfil an anti-theft function, for hill starts, etc.

Known anti-theft systems act on various control or maneuvering members of the vehicle, and are in each case elements which are added to the engine compartment. Some actuate the brakes if the vehicle is occupied by an unauthorized driver and, in this case, are also complex, bulky and costly systems.

In order to provide an aid to driving, constructors also develop systems for assisting with hill starts.

These systems maintain the application of the brakes for as long as the accelerator pedal is not actuated. These systems are further added to the preceding ones and have the same drawbacks.

The document U.S. Pat. No. 5,096,267 discloses a booster of the type recalled hereinabove in which the plunger is formed of two parts which can move with respect to each other, the first valve seat being formed on one of these parts of the plunger. The other part receives the control rod and is capable of bearing on the reaction disk. One or two electromagnets may be actuated in order to move the part carrying the first valve seat with respect to the other part on which the control rod bears in order to fulfil the functions of preventing the wheels from locking or, in the case of acceleration, from spinning. One or two compression springs are interposed between these two parts.

Such an arrangement with a floating valve seat has numerous drawbacks. Indeed, the length of the plunger, that is to say the axial distance between the front face of the plunger intended to interact with the reaction disk and the valve seat formed on the plunger, must be determined with very low tolerances if the neutral travel and response time of the booster as well as the latter's operational jump is to be controlled precisely. A floating mounting of the valve seat thus no longer makes it possible to control these significant features of the booster.

The subject of the present invention is therefore a pneumatic brake booster whose neutral travel, response time and jump are perfectly determined, which integrates additional functions such as an aid to hill starts and/or an anti-theft device for the vehicle, and which does so in a simple, reliable, and inexpensive fashion in accordance with the safety standards.

In accordance with the invention, this result is obtained with the aid of actuation means for stressing the active part of the valve element forwards in simultaneous interaction with the first and second valve seats.

Other objects, features and advantages will emerge from the following description of embodiments of the present invention given by way of non-limiting example with reference to the appended drawings in which.

The same elements have the same reference numbers in the various figures.

Figure 1:
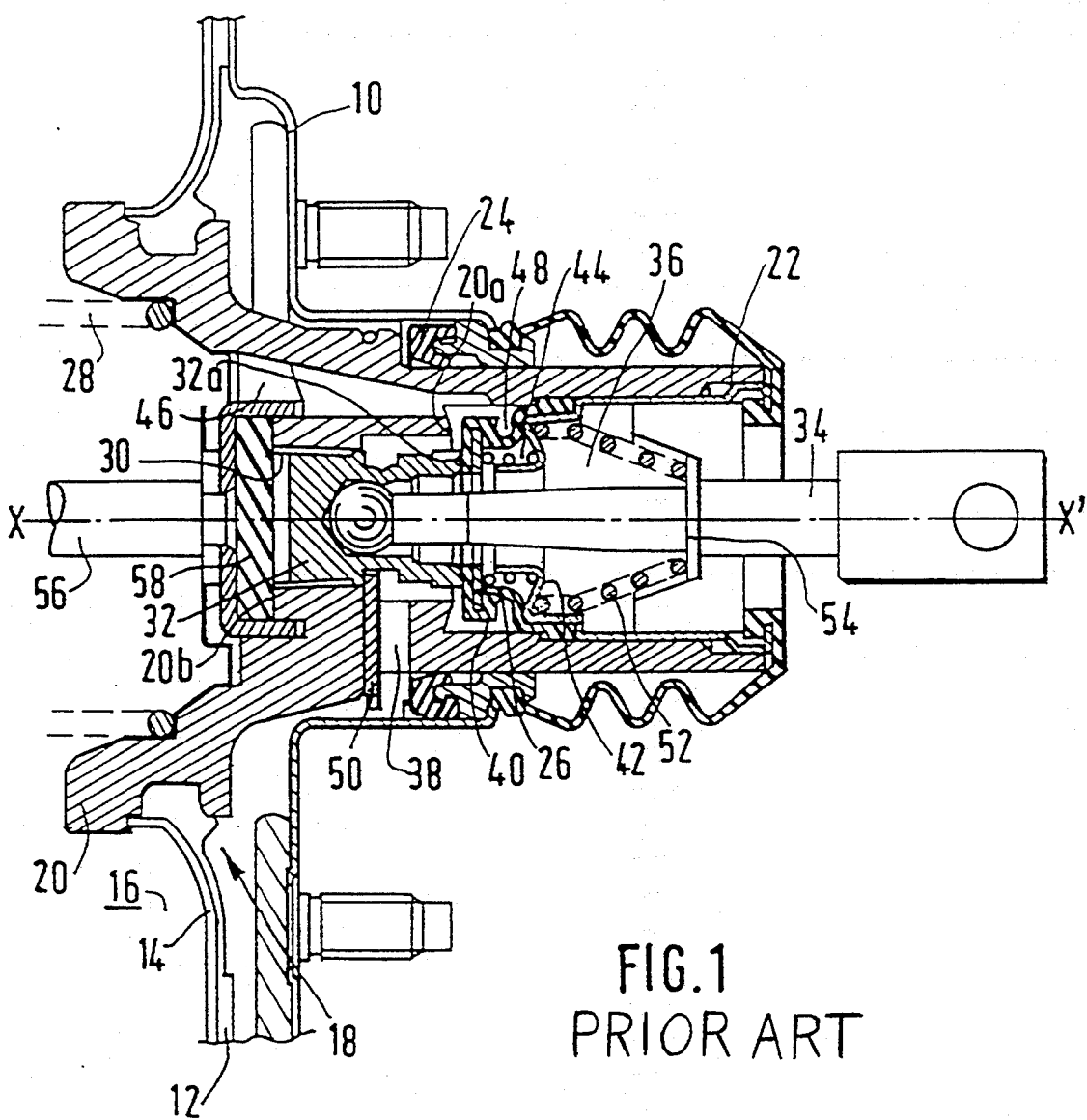
FIG. 1 is a side view, in longitudinal section, representing the central part of a pneumatic brake booster of known type.

FIG. 1 represents part of a brake booster provided in order to be placed, in conventional fashion, between the brake pedal of a vehicle and the master cylinder actuating the hydraulic braking circuit of this vehicle. By convention, the front of the booster is said to be the part of the latter directed towards the master cylinder and the rear of the booster is said to be the part directed towards the brake pedal.

The booster of FIG. 1 comprises an external casing 10 in the form of a shell, having symmetry of revolution about an axis X-X'. Only the back central part of this casing 10 is represented in FIG. 1.

A flexible elastomeric unrolling membrane 12, reinforced in its central part by a metal support disk 14 also known as the skirt, defines, within the space delimited by the casing 10, a front chamber 16 and a back chamber 18. The external peripheral edge (not shown) of the membrane 12 is fixed in leaktight fashion to the external casing 10. The internal peripheral edge of this same membrane ends in a bead received in leaktight fashion in an annular groove formed on the external peripheral surface of a hollow booster piston 20 located along the axis X-X' of the booster. This hollow piston 20 extends towards the back in the form of a tubular part 22 which passes through the back wall of the casing 10 in leaktight fashion by virtue of a reinforced annular seal 24.

A compression spring 28 interposed between the piston 20 and the front wall (not shown) of the external casing 10 usually holds the piston 20 and the skirt 14 in a back rest position illustrated in FIG. 1, in which the back chamber 18 has its minimum volume and the front chamber 16 its maximum volume.

In its central part situated between the tubular rear part 22 and the front part in which the membrane 12 and the skirt 14 are fixed, the piston 20 has a bore 30 in which there is received, with sliding, a plunger 32 also having symmetry of revolution about the axis X–X'. The front end of a control rod 34 of the booster, also located along the axis X–X', is mounted so as to swivel in the plunger 32. The back end of this rod 34, which projects outside the tubular part 22 of the piston 20, is actuated directly by the brake pedal of the vehicle (not shown).

The annular space 36 delimited between the control rod 34 and the tubular part of the piston 20 opens out to the external atmosphere at the back of the booster, for example by means of an air filter. Towards the front, this same annular space may communicate with the back chamber 18 through a radial passage 38 formed in the central part of the piston, when booster means actuated by the plunger 32 are actuated.

Conventionally, these booster means comprise a three-way valve comprising an annular valve element mounted in the tubular part of the piston and having an active part 40 interacting with two annular valve seats 20a and 32a formed respectively on the central part of the piston 20 and on the plunger 32. An insert 26 is located on the back face of the active part 40 in order to rigidify the latter and ensure its flatness in a plane perpendicular to the axis X–X'.

The active part 40 of the valve element constitutes the front end, of smaller diameter, of a flexible elastomeric sleeve whose back end terminates in a bead mounted in leaktight fashion inside the tubular part 22 of the piston 20. This bead is held in place by a metal cup 42, on which there bears a compression spring 44 tending to move the active part 40 of the valve element forwards.

The annular valve seat 32a is formed on the back end face of the plunger 32. Comparably, the annular valve seat 20a is formed on the back end face of the central part of the piston 20, around the seat 32a. According to the position of the plunger 32 inside the piston 20, this arrangement allows the valve element 40 to bear constantly in a sealed fashion against at least one of the valve seats 32a and 20a under the action of the valve-element spring 44.

A second passage 46 is formed in the central part of the piston 20, approximately parallel to its axis X–X', in order to cause the front chamber 16 of the booster to communicate with an annular chamber 48 formed around the valve element 40, inside the tubular part 22 of the piston 20. When the plunger 32 occupies its back rest position illustrated in FIG. 1, in which the valve element 40 bears in a sealed fashion on the seat 32a of the plunger 32 and remote from the seat 20a of the piston 20, the front 16 chamber and back 18 chamber of the booster thus communicate with each other via the passage 46, the annular chamber 48 and the passage 38.

Conventionally also, at least one stop member 50 mounted in the central part of the piston 20 limits, towards the back, the axial travel of the plunger 32 inside the said piston. The plunger 32 is usually held in the back rest position defined by the member 50 by means of a compression spring 52 interposed between the cup 42 and a washer 54 itself bearing on a shoulder formed on the control rod 34.

In its central part, the piston 20 comprises an annular front face 20b, at the centre of which the bore 30 opens out. This annular front face 20b of the piston 20 acts on the back face of a thrust rod 56, via a reaction disk 58 made from a deformable material such as an elastomer. More precisely, the thrust rod 56 and the reaction disk 58 are located along the axis X–X' of the booster, in the extension of the control rod 34 and the plunger 32.

The operation of this known booster is conventional and may be described succinctly as follows.

When the booster is installed in a vehicle, the front chamber 16 communicates permanently with a vacuum source.

In a first instance, the driver pushing the brake pedal in has the effect of equaling the prestress force of the spring 52 decreased by the prestress force of the spring 44. During this slight displacement of the control rod 34 and of the plunger 32, the valve element 40, under the action of the spring 44, follows the seat 20a of the piston; the front chamber 16 and back chamber 18 of the booster are therefore isolated from each other.

In a second actuation phase of the brake, the plunger 32 is displaced sufficiently forwards so that the valve element 40 is in leaktight contact with the seat 20a of the piston and starts to move away from the seat 32a of the plunger. Under these conditions, the back chamber 18 of the booster, isolated from the front chamber 16, enters into communication with the atmosphere. Since the front chamber 16 is still connected to a vacuum source, a pressure difference is therefore set up on the two faces of the skirt 14/membrane 12 assembly which generates the boost force desired on the thrust rod 56.

When the driver of the vehicle wishes to moderate or stop the braking action, he releases his force on the brake pedal, and the spring 52 returns the control rod 34 backwards. The rod 34, in turn, brings the plunger 32 backwards, the valve seat 32a comes into contact with the valve element 40, thus interrupting the communication between the back chamber 18 and the atmosphere, and returning the valve element 40 backwards. The valve element 40 then loses contact with the valve seat 20a and opens the communication between the two chambers 16 and 18. The pressures in the front and back chambers are therefore balanced and the spring 28 returns the piston 20 and the skirt 14 towards their rest positions.

In accordance with the invention, when it is desired to integrate additional functions, such as an aid to hill starts or an anti-theft device for the vehicle, into a booster such as that which has just been described actuation means are provided in order to stress the active part 40 of the valve element forwards, so that it interacts simultaneously with the first and second valve seats. A first embodiment of these actuation means is represented in FIG. 2.

Figure 2:
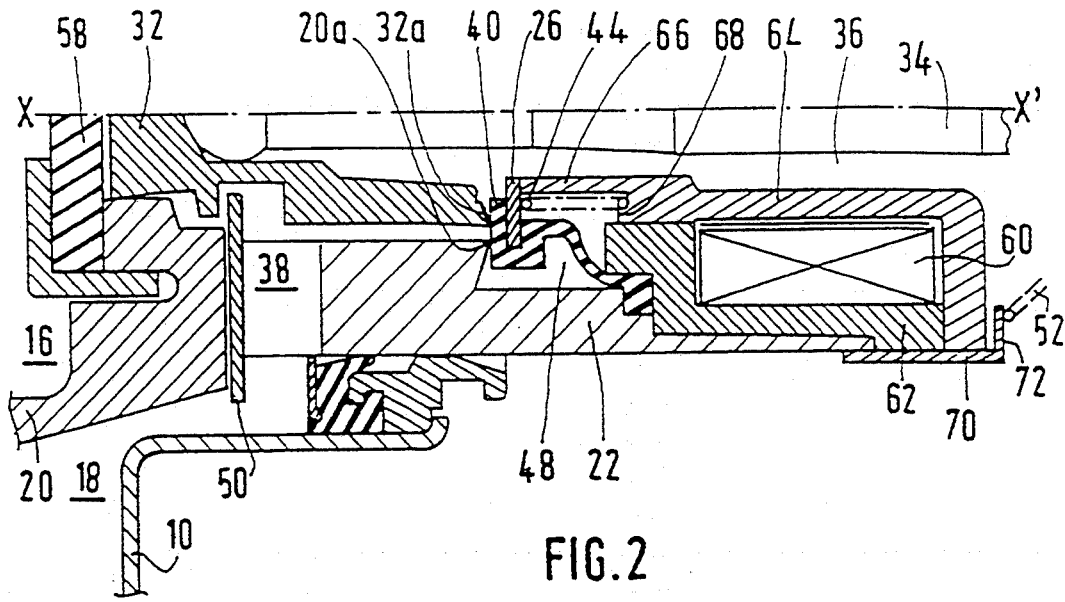
FIG. 2 is a side view, in longitudinal half-section, representing a first embodiment of the actuation means according to the present invention.

FIG. 2 shows that the back tubular part 22 of the piston 20 is equipped with an electromagnet winding 60 of axis X–X' located inside a case 62 made from a ferromagnetic material ensuring the circulation of the magnetic flux. As a variant, it could of course be envisaged to produce the tubular part 22 from a ferromagnetic material and thus eliminate recourse to a specific case. A movable armature 64 also made from ferromagnetic material is located inside the winding 60. The armature 64 is tubular and is extended forwards by a tubular part 66, whose diameter is less than that of the armature 64, so as to make a radial shoulder 68 between these two parts.

The valve-element spring 44 is thus located between the insert 26 and the radial shoulder 68 of the armature 64 whose backwards movement is limited, for example by means of a flange 70 fixed to the outside of the tubular back part 22 of the piston and/or to the case 62 if it has been decided to use one. The flange 70 comprises a part 72 in the shape of a disk extending radially towards the axis X-X', defining the back position of the armature 64, and advantageously capable of forming a support for the return spring 52 of the control rod 34. This flange 70 is clearly made from a non-magnetic material.

The operation of the booster produced in accordance with the invention can easily be understood from the preceding explanations.

When the booster is at rest and the winding 60 does not have any current flowing through it, the armature 64 is stressed backwards by the spring 44 bearing on the disk 72, the spring 44 stressing the active part 40 of the valve element forwards. Pushing in the brake pedal then gives rise to the operational phases which have been described above, and the sensation of braking and [sic] identical, for the driver of the vehicle, to that which is provided by a conventional booster.

In contrast, the booster produced in accordance with the invention very easily allows other functions to be added to it. This is the case if the vehicle is equipped with sensors for detecting a situation in which the vehicle is stationary on a hill: the speed sensor already equips all vehicles, and the slope sensor may be produced very simply in the form of a ball-type or mercury-drop tilt switch. The operation is, then, as follows: if the situation of stopping on a hill is detected, the electromagnet 60 is then excited, which has the effect of causing the armature 64 to advance to come into abutment against the case 62. In this movement, the front tubular part 66 of the armature 64 comes into contact with the insert 26 and displaces the active part of the valve element 40 forwards. Said active part, which was already in contact with the valve seat 32a of the plunger, in turn displaces the plunger 32 forwards until the active part itself comes into contact with the valve seat 20a formed on the piston.

This is the situation represented in FIG. 2, where the booster is in the position for the end of the first actuation phase described above: the front chamber 16 and back chamber 18 are isolated from each other, the back chamber being, in addition, isolated from the atmosphere.

The booster therefore finds itself frozen in the configuration of pressures which it occupied just before excitation of the electromagnet 60; in the case where the booster was at rest, the back chamber was subjected to the same pressure as the front chamber, the piston 20 and the skirt 14 being in their back rest position. In the case where the driver had previously pressed on the brake pedal, the booster had passed into the second actuation phase and the pressure in the back chamber was greater than the pressure in the front chamber, the piston 20 and the skirt 14 moving forwards in order to actuate the thrust rod 56 and the master cylinder associated with the booster.

In these two situations (equal or different pressures in the front and back chambers), excitation of the electromagnet 60 has the effect of isolating, independently of the wish of the driver, the front and back chambers in order to retain the booster in its rest or braking position. In each of these situations, if the driver presses on the brake pedal, this action has the effect of moving the valve seat 32a of the valve element 40 away in order to create or increase the pressure difference between the front and back chambers, in the same way as in the second actuation phase of a conventional booster.

In contrast, after detecting the stationary situation on a hill, and actuating the electromagnet 60, when the driver of the vehicle releases his force on the brake pedal, the control rod 34 returns the plunger 32 backwards under the effect of the spring 52. The valve seat 32a comes into contact with the valve element 30, which is at this moment stressed forwards by the tubular part 66 of the armature 64 and which cannot therefore leave the valve seat 20a. As a result, the pressures in the front and back chambers can no longer balance and a boost force continues to exist, although there is no longer any input force applied to the control rod 34. This boost force is transmitted via the thrust rod 56 to the master cylinder, which therefore continues to generate a hydraulic pressure transmitted to the brake motors of the vehicle.

The vehicle is kept stationary without the driver using the normal braking devices or emergency braking devices. The driver is therefore no longer preoccupied with keeping his vehicle stationary on a hill and can pay attention to other tasks, and mainly to moving his vehicle off again. It goes without saying that second sensors are located on the vehicle to detect such an intention of the driver in order to switch off the electromagnet 60, and thus cause the pressure in the brake motors to drop. Such sensors may be produced simply in order to detect the movement of the accelerator pedal and/or the clutch pedal and/or the gear stick.

In accordance with the invention a pneumatic brake booster has thus clearly been produced which integrates the additional function of automatically remaining stationary on a hill for an aid to moving off in this situation. It can be conceived that the booster of the invention may also integrate the anti-theft function of the vehicle.

Indeed, when the sensors detect that the vehicle is occupied by an unauthorized driver, the electromagnet 60 is excited whilst the second sensors are inhibited. In this way, as has been explained above, as soon as the unauthorized driver has braked, the vehicle is immobilized, since the hydraulic pressure in the brake motors will only be able to increase because the pneumatic pressure in the back chamber of the booster can itself only increase, any communication with the front chamber being impossible.

Of course, the operational mode of the electromagnet 60 may be reversed, so that its rest position is the one represented in FIG. 2, a compression spring, for example, being provided between the front face of the disk 72 and the back face of the armature 64, in order to stress the active part 40 of the valve element forwards to rest, whilst the excitation of the electromagnet 60 produces the backwards movement of the movable armature 64 in order to give the booster a conventional operation. Such an operational mode of the electromagnet 60 allows the booster to fulfil its anti-theft function of the vehicle even if the supply to the electromagnet 60 is interrupted.

In accordance with the invention a pneumatic brake booster has thus clearly been produced which is also capable of providing the capacity for automatically remaining stationary on a hill for an aid to moving off and an anti-theft function for the vehicle. Such an embodiment is particularly simple and inexpensive because solely the back part of the tubular part 22 of the piston 20 has been slightly modified in comparison with a conventional booster, all the other components remaining unchanged. Consequently, all the operational characteristics of the booster such as the neutral travel, response time and the jump are determined and adjusted identically to those of a conventional booster.

It has been seen that exciting the electromagnet 60 has the effect of stressing the active part of the valve element 40 forwards in simultaneous interaction with the valve seats formed on the plunger and on the piston. In order to do this, the armature 64 moves the valve element and the plunger forwards until the valve element comes into contact with the valve seat formed on the piston.

The displacement of the plunger causes the displacement of the control rod 34 and of the brake pedal which is associated with it, counter to the action of the spring 52. As a result, the electromagnet must overcome the inertia of the plunger/control rod/pedal assembly as well as the prestress of the spring 52, and the operation of the assembly may be judged to be too slow for certain top-of-the-range vehicles, or the consumption of the electromagnet 60 may be judged excessive in other, bottom-of-the-range vehicles.

Figure 3:
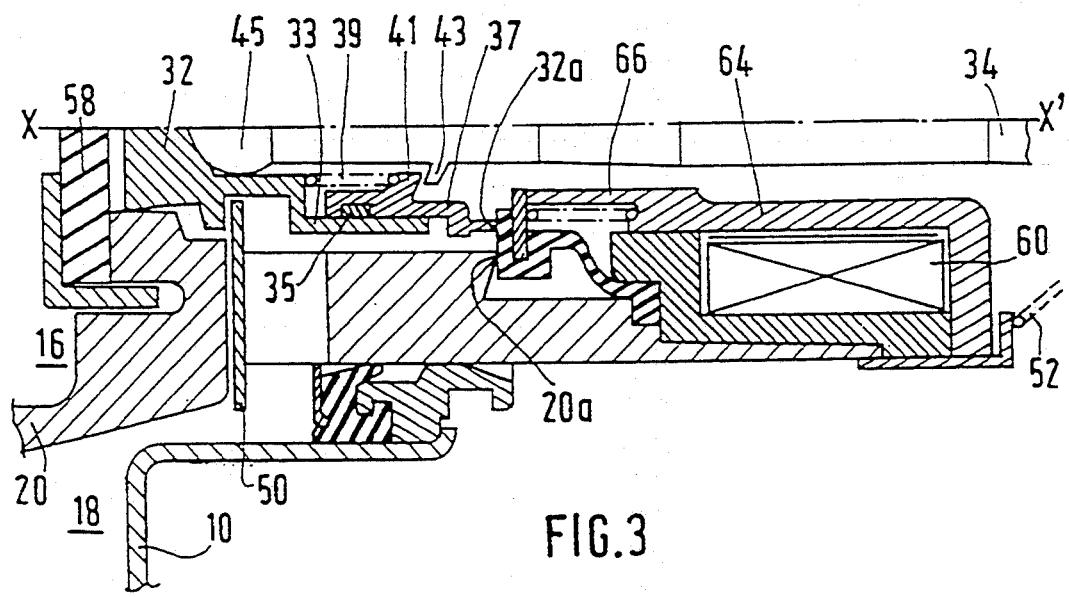
FIG. 3 is a view similar to FIG. 2, representing an embodiment variant of FIG. 2.

FIG. 3 shows an embodiment variant of FIG. 2, which provides a solution in these two cases. In comparison with the booster of FIG. 2, solely the plunger 32 and the control rod 34 have been slightly modified.

The back part of the plunger 32 is formed with a staged bore 33 in which there slides, in leaktight fashion by virtue of a seal 35, a tubular component 37. The back end of the component 37 forms the valve seat 32a of the plunger, and a compression spring 39 is located between two radial shoulders formed one in the staged bore of the plunger 32, and the other at the front of a projecting part 41 extending radially towards the axis X–X′ of the component 37.

The control rod 34 is formed with a projecting part 43 extending radially outwards, and whose front face has a concave spherical profile whose center is situated at the center of rotation of the part 45 of the rod 34 swiveling in the plunger 32. The projecting part 41 of the component 37 has a back face whose profile is convex and spherical and of the same radius of curvature as the front face of the projecting part 43.

With such an arrangement, when the armature 64 is in its back position, the component 37 is usually in abutment via its part 41 on the part 43 of the control rod 34. The two parts 41 and 43, having complementary profiles, allow the rod 34 to swivel in the plunger 32, whilst retaining a fixed predetermined distance between the front face of the plunger 32, interacting with the reaction disk 58, and the valve seat 32a.

When the armature 64 is in the back position, the booster therefore has a completely conventional operation, as has been explained above, actuation of the control rod 34 causing the plunger 32/component 37 assembly to move as a rigid assembly.

In contrast, in order to move the armature 64 so that it occupies its front position so as to put the active part of the valve element 40 in simultaneous contact with the valve seats 32a and 20a, it is sufficient to overcome solely the prestress of the spring 39. As has been shown in FIG. 3, in which the armature 64 is in its front position, the plunger 32 remains bearing on the abutment member 50 under the stress of the spring 52 acting on the control rod 34, whilst the valve element 40 is in simultaneous contact with the valve seats 32a and 20a.

Figure 4:
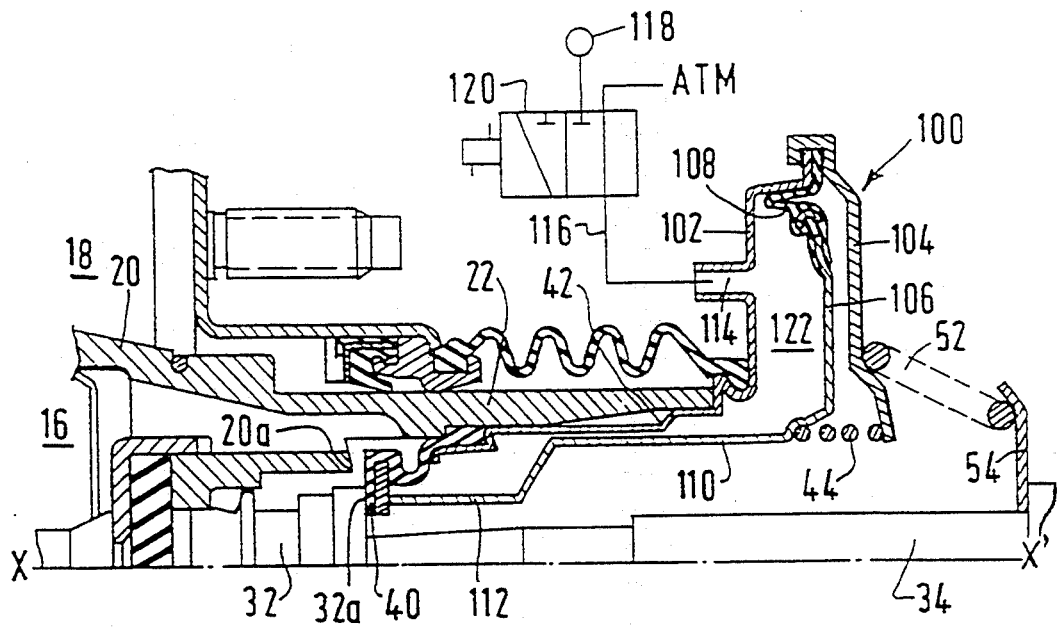
FIG. 4 is a side view, in longitudinal half-section, representing a second embodiment of the actuation means according to the present invention.

FIG. 4 represents a second embodiment of the invention, in which the electromagnet of the preceding embodiment has been replaced by a pneumatic actuator.

It can be seen in this figure that the back tubular part 22 of the piston 20 is formed with an annular compartment 100 formed from one front wall 102 and one back wall 104, for example crimped onto the front wall 102. The front part 102 may, for example, be produced as a single component with the metal cup 42. Inside the compartment 100 there is located a movable partition 106, bonded at its external periphery to a membrane 108 received in leaktight fashion between the walls 102 and 104. The internal peripheral edge of the partition 106 is extended forwards by a cylindrical part 110 sliding in the metal cup 42 and ending in a tubular part 112 fulfilling an identical role to the tubular part 66 of the preceding embodiment.

The front wall 102 of the compartment 100 is fitted with an opening 114 into which a pipe 116 opens which is alternately connected to atmosphere ATM or to a vacuum source 118 by a three-way two-position solenoid valve 120. The vacuum source may advantageously consist of the vacuum source permanently connected to the front chamber of the booster. The valve-element spring 44 is located between the movable partition 106 and the back wall 104, atmospheric pressure always being present between these two.

It can therefore easily be understood that, by connecting the space 122 situated between the movable partition 106 and the front wall 102 alternately to the atmosphere or to the vacuum source 118 under the effect of the control of the solenoid valve 120, a pressure difference will be created on or eliminated from the movable partition 106, which pressure difference will cause the tubular part 112 to assume one or other of the two positions described previously for the tubular part 66.

Of course, use may be made, with the embodiment of FIG. 4, of a plunger such as that described in the embodiment of FIG. 3, that is to say made in two parts 32 and 37 stressed apart by the spring 39, projecting parts 41 and 43 being provided on the part on the part [sic] 37 and the control rod 34.

Figure 5:
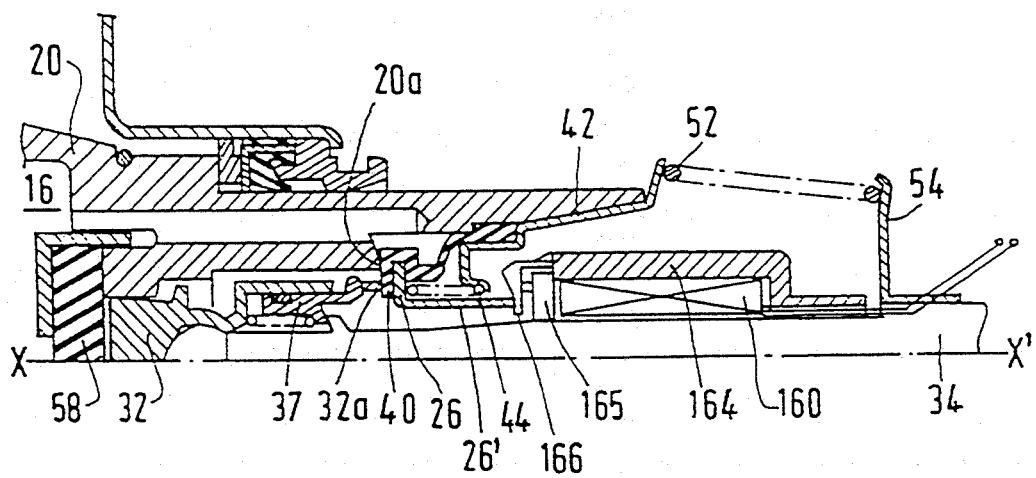
FIG. 5 is a side view, in longitudinal half-section, representing a third embodiment of the actuation means according to the present invention.

FIG. 5 illustrates a third embodiment of the invention in which the means for actuating the valve element 40 are carried by the control rod 34, and no longer by the piston 20 as previously.

It can be seen in this figure that a winding 160 is located around the control rod 34, which may advantageously be produced from a ferromagnetic material in order to facilitate circulation of the magnetic flux. A movable armature 164 made from a ferromagnetic material is located around the winding 160. A washer 165, also made from a ferromagnetic material, is securely fastened to the control rod 34 in order to close the magnetic circuit. The control rod 34, associated with the washer 165, thus forms the case of the electromagnet 160.

The armature 164 is securely fastened to a component 166 extending forwards and surrounding the washer 165. As in the preceding embodiments, when the armature 164 occupies its front position, it stresses, by means of the component 166, the valve element 40 in simultaneous interaction with the two valve seats 20a and 32a, the insert 26 being, for example, extended backwards by a tubular part 26′ on which the component 166 comes to bear. According to this embodiment, the plunger 32 must be formed in two parts 32 and 37, as in the embodiment of FIG. 3.

The present invention is not limited to the embodiments which have been described, but is capable of undergoing numerous modifications which will be obvious to the expert. Thus, the electromagnetic or pneumatic actuators which have been described may be replaced by any other type of actuator, for example a mechanical or hydraulic actuator.

We claim:

1. A motor vehicle pneumatic brake booster, comprising a casing inside which a piston formed from a rear tubular part supporting a skirt defines, with the aid of an unrolling membrane, a front chamber connected permanently to a vacuum source and a back chamber connected alternately to the front chamber or atmosphere via valve means actuated by a control rod capable of bearing, by means of a plunger, on one face of a reaction disk fastened securely to a thrust rod, the valve means comprising a valve element interacting via an active part with a first valve seat formed on the plunger and a second valve seat formed on the piston, the valve element normally being stressed forwards by elastic means, the booster further comprising actuation means provided to stress an active part of the valve element forwards in simultaneous interaction with the first and second valve seats.

2. The booster according to claim 1, wherein the actuation means is formed on the rear tubular part of the piston.

3. The booster according to claim 2, wherein the actuation means comprises a winding located inside the rear tubular part of the piston, and a movable armature located inside the winding.

4. The booster according to claim 3, wherein the movable armature is extended forwardly by a tubular part and is capable of moving the active part of the valve element forward in simultaneous interaction with the first and second valve seats.

5. The booster according to claim 4, wherein the first valve seat is formed on a tubular component sliding in leaktight fashion in a bore formed in a rear part of the plunger, a spring located between the plunger and the tubular component, and a projecting part formed on the tubular component and usually coming into abutment on a projecting part formed on the control rod.

6. The booster according to claim 2, wherein the actuation means comprises a compartment inside which a moving partition is extended forwardly at an internal peripheral edge by a cylindrical part capable of moving the active part of the valve element forward in simultaneous interaction with the first and second valve seats, the movable partition determining, within the compartment, a volume alternately to atmosphere or a vacuum source via control means.

7. The booster according to claim 6, wherein the first valve seat is formed on a tubular component sliding in leaktight fashion in a bore formed in the rear part of the plunger, a spring located between the plunger and the tubular component, a projecting part formed on the tubular component and usually coming into abutment on a projecting part formed on the control rod.

8. The booster according to claim 1, wherein the actuation means is carried by the control rod.

9. The booster according to claim 8, wherein the actuation means comprises a winding located around the control rod and a movable armature located around the winding, the armature fastened securely to a component extending forwardly and capable of moving the active part of the valve element forward in simultaneous interaction with the first and second valve seats, the first valve seat formed on a tubular component sliding in leaktight fashion in a bore formed in the rear part of the plunger, a spring located between the plunger and the tubular component, a projecting part formed on the tubular component and usually coming into abutment on a projecting part formed on the control rod.

10. The booster according to claim 9, wherein the control rod is made from a ferromagnetic material.

* * * * *